(12) United States Patent
Holland et al.

(10) Patent No.: US 7,954,324 B2
(45) Date of Patent: Jun. 7, 2011

(54) GAS TURBINE ENGINE

(75) Inventors: Stephen E. Holland, Oviedo, FL (US); Gerard McQuiggan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1097 days.

(21) Appl. No.: 11/784,153

(22) Filed: Apr. 5, 2007

(65) Prior Publication Data
US 2008/0245073 A1 Oct. 9, 2008

(51) Int. Cl.
*F02C 7/224* (2006.01)
*F02C 7/16* (2006.01)

(52) U.S. Cl. ............................................ 60/736; 60/806
(58) Field of Classification Search ................ 60/736, 60/806
See application file for complete search history.

(56) References Cited

U.S. PATENT DOCUMENTS

| | | | |
|---|---|---|---|
| 5,394,687 A | 3/1995 | Chen et al. | |
| 5,782,076 A * | 7/1998 | Huber et al. | 60/782 |
| 5,829,245 A | 11/1998 | McQuiggan et al. | |
| 6,041,588 A | 3/2000 | Brückner et al. | |
| 6,089,012 A * | 7/2000 | Sugishita et al. | 60/736 |
| 6,145,295 A | 11/2000 | Donovan et al. | |
| 6,293,088 B1 | 9/2001 | Moore et al. | |
| 6,454,526 B1 | 9/2002 | Cunha et al. | |
| 6,512,379 B2 | 1/2003 | Harrold et al. | |
| 6,691,519 B2 | 2/2004 | Little | |
| 6,782,703 B2 | 8/2004 | Dovali-Solis | |
| 6,857,270 B2 * | 2/2005 | Kobayashi et al. | 60/736 |
| 7,124,591 B2 | 10/2006 | Baer et al. | |
| 2002/0108379 A1 * | 8/2002 | Akiyama et al. | 60/806 |
| 2005/0150231 A1 | 7/2005 | Laster et al. | |
| 2006/0042266 A1 * | 3/2006 | Albers et al. | 60/806 |

* cited by examiner

*Primary Examiner* — Ted Kim

(57) ABSTRACT

A gas turbine engine is provided comprising a compressor, a fuel supply apparatus, a combustor, and a turbine. The fuel supply apparatus comprises a fuel source, a cooling apparatus including a heat exchanger and structure for defining a first path for fuel to travel from the fuel source to the heat exchanger and a second path for fuel to travel away from the heat exchanger. The combustor functions to receive the compressed air from the compressor and the fuel from the heat exchanger, combine the air and fuel to create an air/fuel mixture and ignite the air/fuel mixture to create combustion products. The cooling apparatus further comprises structure coupled to and extending between the heat exchanger and at least one of a plurality vanes in the turbine for circulating a coolant fluid through at least one vane and the heat exchanger. In another embodiment, pipe supply structure extends from a fuel source through an end section of a turbine casing. In a further embodiment, a heat exchanger of a heat recovery steam generator is provided in a turbine casing end section.

6 Claims, 7 Drawing Sheets

GAS TURBINE ENGINE

FIELD OF THE INVENTION

The present invention relates to a gas turbine engine and, more preferably, to a gas turbine engine comprising structure for preheating a fuel to be provided to a combustor within the gas turbine engine.

BACKGROUND OF THE INVENTION

It is known to preheat a fuel to be provided to a combustor of a gas turbine engine. For example, U.S. Patent Application Publication No. 2005/0150231 A1 discloses passing a portion of compressed air from a compressor to a heat exchanger to heat a fuel to be provided to a combustor. As a further example, U.S. Pat. No. 6,041,588 discloses a gas-turbine and steam-turbine system including a fuel preheating heat exchanger coupled to a further heat exchanger which, in turn, is coupled to a medium pressure economizer. The fuel preheating heat exchanger, preheats a fuel upstream of a turbine to which it is to be supplied.

Alternative systems for preheating a gas turbine engine fuel so as to improve efficiencies are desired.

SUMMARY OF THE INVENTION

In accordance with a first aspect of the present invention, a gas turbine engine is provided comprising a compressor, a fuel supply apparatus, a combustor, and a turbine. The compressor functions to compress ambient air. The fuel supply apparatus comprises a fuel source, a cooling apparatus including a heat exchanger and first structure for defining a first path for fuel to travel from the fuel source to the heat exchanger and a second path for fuel to travel away from the heat exchanger. The combustor functions to receive the compressed air from the compressor and the fuel from the heat exchanger, combine the air and fuel to create an air/fuel mixture and ignite the air/fuel mixture to create combustion products. The turbine comprises a plurality of stationary vanes, a plurality of rotatable blades and a rotatable shaft and disc assembly coupled to the blades. The turbine receives the combustion products from the combustor such that the combustion products expand in the turbine causing the blades and shaft and disc assembly to rotate. The cooling apparatus further comprises second structure coupled to and extending between the heat exchanger and at least one of the vanes in the turbine for circulating a coolant fluid through the at least one vane and the heat exchanger. The coolant fluid cools the at least one vane as the coolant fluid passes through the at least one vane and the coolant fluid transfers energy in the form of heat to the fuel as the coolant fluid passes through the heat exchanger.

The coolant fluid may comprise air, steam, ethylene glycol or other fluid.

In one embodiment, the cooling apparatus second structure is coupled to and extends between the heat exchanger and a plurality of the vanes.

In accordance with a second aspect of the present invention, a gas turbine engine is provided comprising a compressor, a fuel supply apparatus, a combustor and a turbine. The compressor functions to compress ambient air. The fuel supply apparatus comprises a fuel source. The combustor receives the compressed air from the compressor and the fuel from the fuel supply apparatus, combines the air and fuel to create an air/fuel mixture and ignites the air/fuel mixture to create combustion products. The turbine comprises a casing for housing a plurality of stationary vanes, a plurality of rotatable blades and a rotatable shaft and disc assembly coupled to the blades. The casing receives the combustion products from the combustor such that the combustion products expand within the casing causing the blades and shaft and disc assembly to rotate. The casing comprises an end section through which the expanded combustion products exit the casing. The fuel supply apparatus further comprises pipe supply structure extending from the fuel source through the end section of the turbine casing to the combustor. The fuel passing through the pipe supply structure is preheated by the expanded combustion products passing through the end section of the turbine casing.

The pipe supply structure may comprise first pipe structure extending through the end section of the turbine casing and second pipe structure extending through the end section of the turbine casing and positioned about at least a portion of the first pipe structure. The fuel moves through the first pipe structure.

The first pipe structure may comprise a plurality of pipes and the second pipe structure may comprise a plurality of pipes.

In accordance with a third aspect of the present invention, a gas turbine engine in combination with a heat recovery steam generator is provided. The gas turbine engine comprises a compressor, a fuel supply apparatus, a combustor and a turbine. The compressor compresses ambient air. The fuel supply apparatus comprises a fuel source. The combustor receives the compressed air from the compressor and the fuel from the fuel supply apparatus, combines the air and fuel to create an air/fuel mixture and ignites the air/fuel mixture to create combustion products. The turbine comprises a casing for housing a plurality of stationary vanes, a plurality of rotatable blades and a rotatable shaft and disc assembly coupled to the blades. The casing receives the combustion products from the combustor such that the combustion products expand within the casing causing the blades and shaft and disc assembly to rotate. The casing comprises an end section through which the expanded combustion products exit the casing. The fuel supply apparatus further comprises pipe supply structure extending from the fuel source through the end section of the turbine casing to the combustor. Fuel passing through the pipe supply structure is preheated by the expanded combustion products passing through the end section of the turbine casing. The heat recovery steam generator may comprise a main unit and heat exchange structure located within the turbine casing end section. A working fluid is supplied to the heat exchange structure by the main unit so as to receive energy in the form of heat from the expanded combustion products passing through the end section of the turbine casing.

The pipe supply structure may be located downstream from the heat exchange structure.

DETAILED DESCRIPTION OF THE INVENTION

Figure 1:
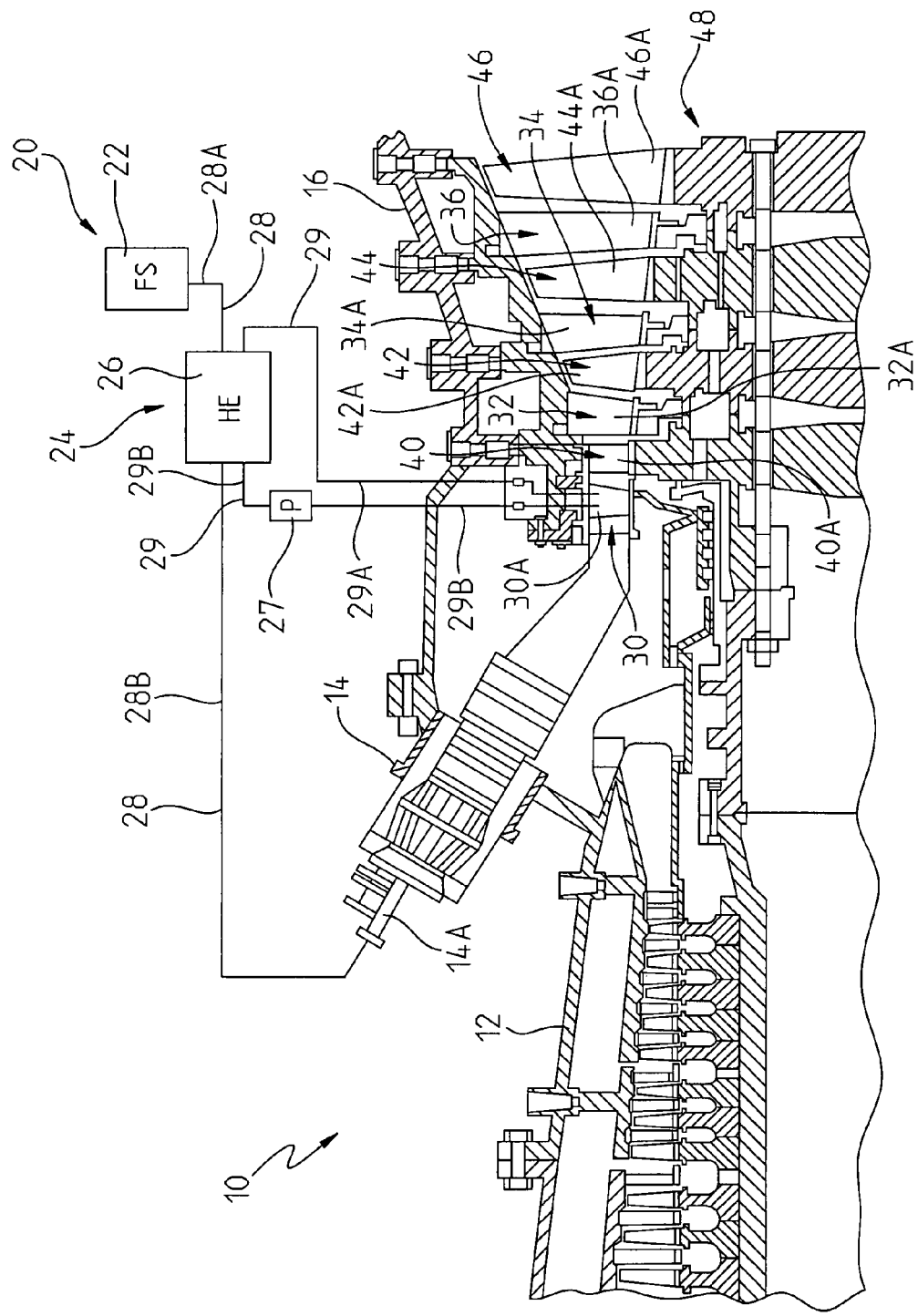
FIG. 1 is a view, partially in cross section, of a gas turbine engine constructed in accordance with a first embodiment of the present invention.

FIG. 1 illustrates a gas turbine engine 10 constructed in accordance with a first embodiment of the present invention. The gas turbine engine 10 comprises a compressor 12, a combustor 14, a turbine 16 and a fuel supply apparatus 20. The compressor 12 receives and compresses ambient air. The compressed ambient air is then provided to the combustor 14.

Figure 2:
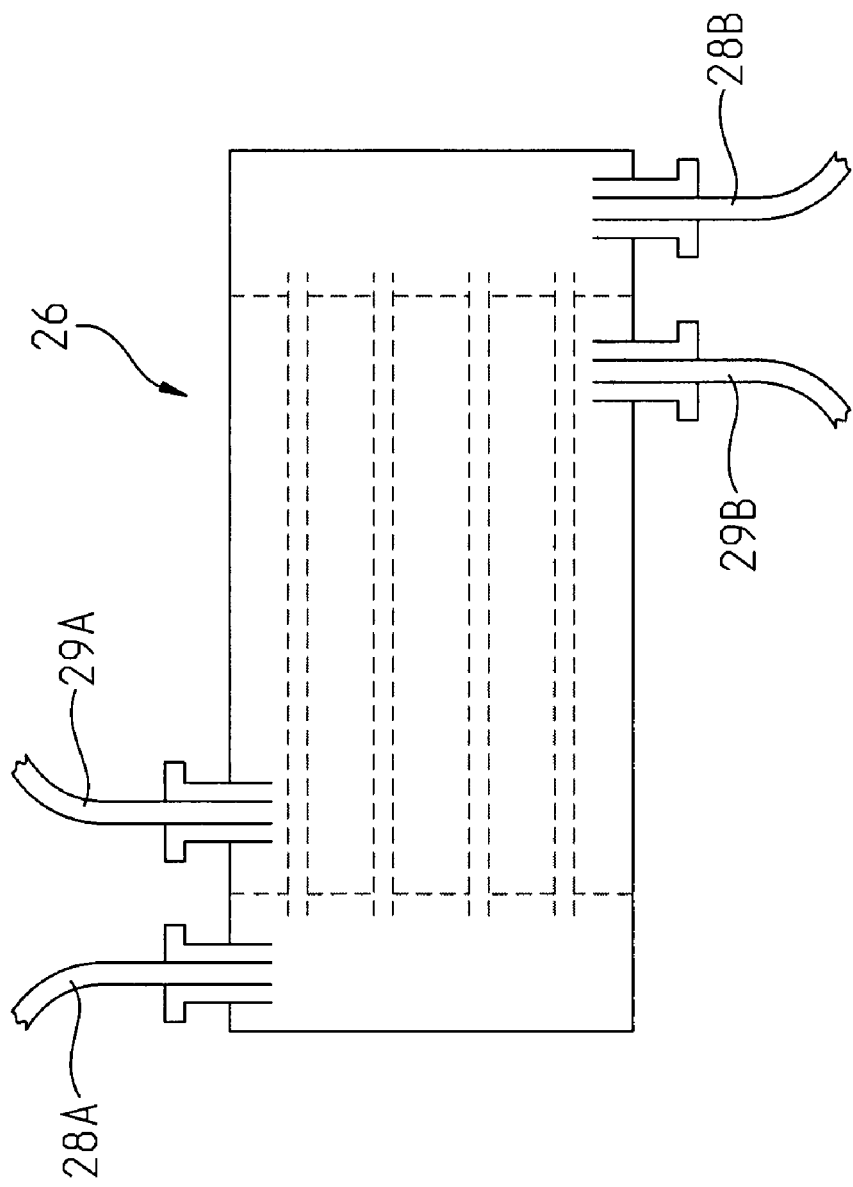
FIG. 2 is a view of a heat exchanger forming part of the gas turbine engine illustrated in FIG. 1.

The fuel supply apparatus 20 comprises a fuel source 22, cooling apparatus 24 including a heat exchanger 26, and first pipe structure 28 for defining a first path 28A for fuel to travel from the fuel source 22 to the heat exchanger 26 and a second path 28B for fuel to travel away from the heat exchanger 26 to a nozzle 14A of the combustor 14, see FIGS. 1 and 2. A fuel supply pressure source (not shown) causes the fuel to travel from the fuel source 22 along the first path 28A to and through the heat exchanger 26 and from the heat exchanger 26 along the second path 28B to the combustor nozzle 14A. It is contemplated that the pipe structure 28 may define a plurality of second paths from the heat exchanger 26 to a plurality of nozzles 14A forming part of the combustor 14.

The combustor 14 functions to receive the compressed air from the compressor 12 and the fuel from the fuel supply apparatus 20, combine the air and fuel to create an air/fuel mixture and ignite the air/fuel mixture to create combustion products or hot working gases.

The turbine 16 comprises a first row 30 of first stationary vanes 30A (only a single first vane is illustrated in FIG. 1), a first row 40 of first rotatable blades 40A (only a single first blade is illustrated in FIG. 1), a second row 32 of second stationary vanes 32A (only a single second vane is illustrated in FIG. 1), a second row 42 of second rotatable blades 42A (only a single second blade is illustrated in FIG. 1), a third row 34 of third stationary vanes 34A (only a single third vane is illustrated in FIG. 1), a third row 44 of third rotatable blades 44A (only a single third blade is illustrated in FIG. 1), a fourth row 36 of fourth stationary vanes 36A (only a single fourth vane is illustrated in FIG. 1), and a fourth row 46 of fourth rotatable blades 46A (only a single fourth blade is illustrated in FIG. 1). The first, second, third and fourth rotatable blades 40A, 42A, 44A and 46A are coupled to a shaft and disc assembly 48. The hot working gases from the combustor 14 travel to the rows 40, 42, 44 and 46 of blades 40A, 42A, 44A and 46A. As the working gases expand through the turbine 16, the working, gases cause the blades 40A, 42A, 44A and 46A, and therefore the shaft and disc assembly 48, to rotate. The number of rows of vanes and blades may vary from the embodiment illustrated in FIG. 1.

Figure 3:
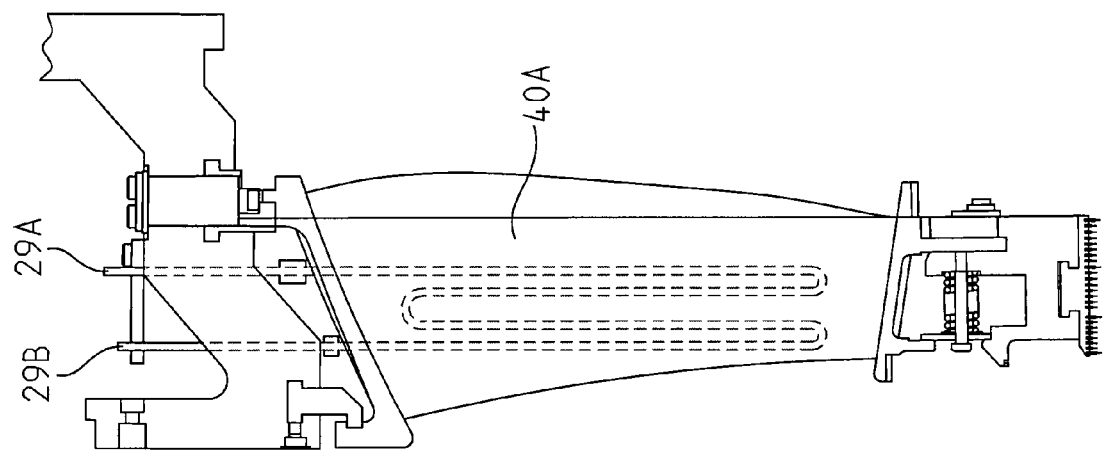
FIG. 3 is a side view of a first vane in the gas turbine engine illustrated in FIG. 1.

In the illustrated embodiment, the cooling apparatus 24 further comprises second pipe structure 29 for defining a plurality of first paths 29A, only one of which is illustrated in FIGS. 1-3, for a coolant fluid to travel from the plurality of first stationary vanes 30A to the heat exchanger 26 and a plurality of second paths 29B, only one of which is illustrated, for the coolant fluid to travel from the heat exchanger 26 to the plurality of first stationary vanes 30A. The coolant fluid circulates through the first and second paths 29A and 29B, the plurality of first stationary vanes 30A and the heat exchanger 26 via a pump 27. The coolant fluid functions to cool the first vanes 30A as the coolant fluid passes through the first vanes 30A, i.e., energy in the form of heat is transferred from the first vanes 30A to the coolant fluid. After the heated coolant fluid leaves the first vanes 30A, it travels via the first paths 29A back to the heat exchanger 26, where the heated coolant fluid functions to preheat the fuel from the fuel source 22. The preheated fuel, after leaving the heat exchanger 26, is provided to the combustor nozzle 14A. Because the fuel is preheated, the operating efficiency of the gas turbine engine 10 is improved.

While only a single heat exchanger 26 is provided in the illustrated embodiment, it is contemplated that a plurality of heat exchangers 26 may be provided.

It is also contemplated that the second pipe structure may define a plurality of additional first and second paths for coolant fluid to travel to the second, third and/or fourth vanes 32A, 34A, 36A so as to cool those vanes 32A, 34A, 36A and also provide further energy in the form of heat to the heat exchanger 26.

The coolant fluid may comprise air, water/steam or other liquid such as ethylene glycol.

Figure 4:
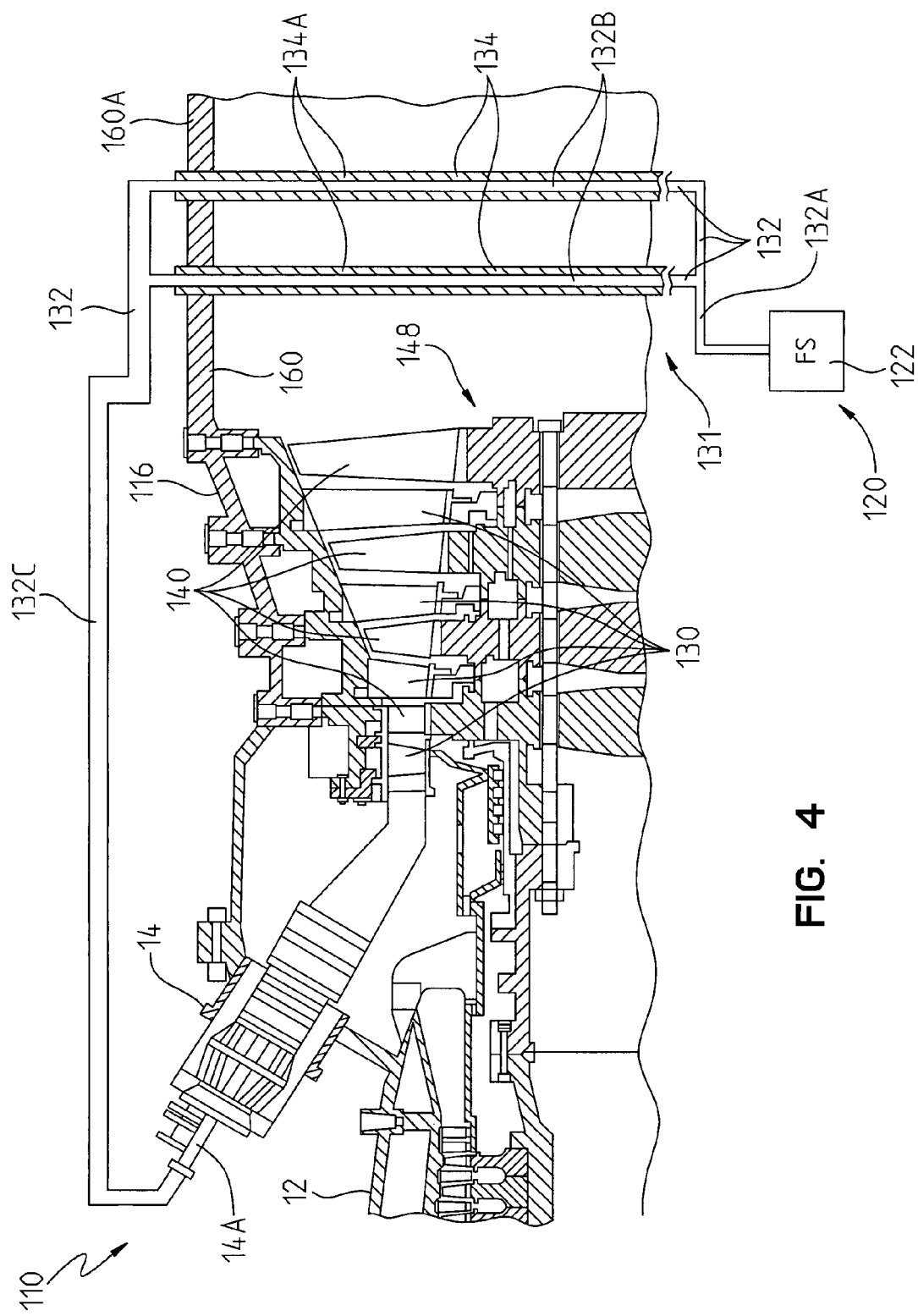
FIG. 4 is a view, partially in cross section, of a gas turbine engine constructed in accordance with a second embodiment of the present invention.

A gas turbine engine 110, constructed in accordance with a second embodiment of the present invention, is illustrated in FIG. 4, wherein like reference numerals indicate like elements. The gas turbine engine 110 comprises a compressor 12, a combustor 14, a turbine 116 and a fuel supply apparatus 120. The compressor 12 receives and compresses ambient air. The compressed ambient air is then provided to the combustor 14.

The combustor 14 functions to receive the compressed air from the compressor 12 and the fuel from the fuel supply apparatus 120, combine the air and fuel to create an air/fuel mixture and ignite the air/fuel mixture to create combustion products or hot working gases.

The turbine 116 comprises a casing 160 for housing a plurality of stationary vanes 130, a plurality of rotatable blades 140 and a rotatable shaft and disc assembly 148 coupled to the blades 140, see FIG. 4. The casing 160 receives the combustion products from the combustor 14 such that the combustion products expand within the casing 160 causing the blades 140 and shaft and disc assembly 148 to rotate. The casing 160 comprises an end section 160A through which the expanded combustion products exit the casing 160, see FIGS. 4 and 5.

The fuel supply apparatus 120 comprises a fuel source 122, and pipe supply structure 131 extending from the fuel source 122 through the end section 160A of the turbine casing 160 to the combustor 14. In the illustrated embodiment, the pipe supply structure 131 comprises first pipe structure 132 and second pipe structure 134. The first pipe structure 132 comprises a first pipe 132A extending from the fuel source 122 to a pair of second pipes 132B which, in turn, extend to a third pipe 132C. The first pipe 132A is coupled to the second pipes 132B which, in turn, are coupled to a third pipe 132C. The third pipe 132C is coupled to the combustor 14. It is contemplated that the third pipe 132C may comprise a plurality of third pipes (not shown) coupled to a plurality of nozzles 14A of the combustor 14. A fuel supply pressure source (not shown) causes the fuel to travel from the fuel source 122 through the first, second and third pipes 132A, 132B and 132C to the combustor 14. The fuel passing through the second pipes 132B is preheated by the expanded combustion products passing through the end section 160A of the turbine casing 160. Because the fuel is preheated, the operating efficiency of the gas turbine engine 110 is improved.

Figure 5:
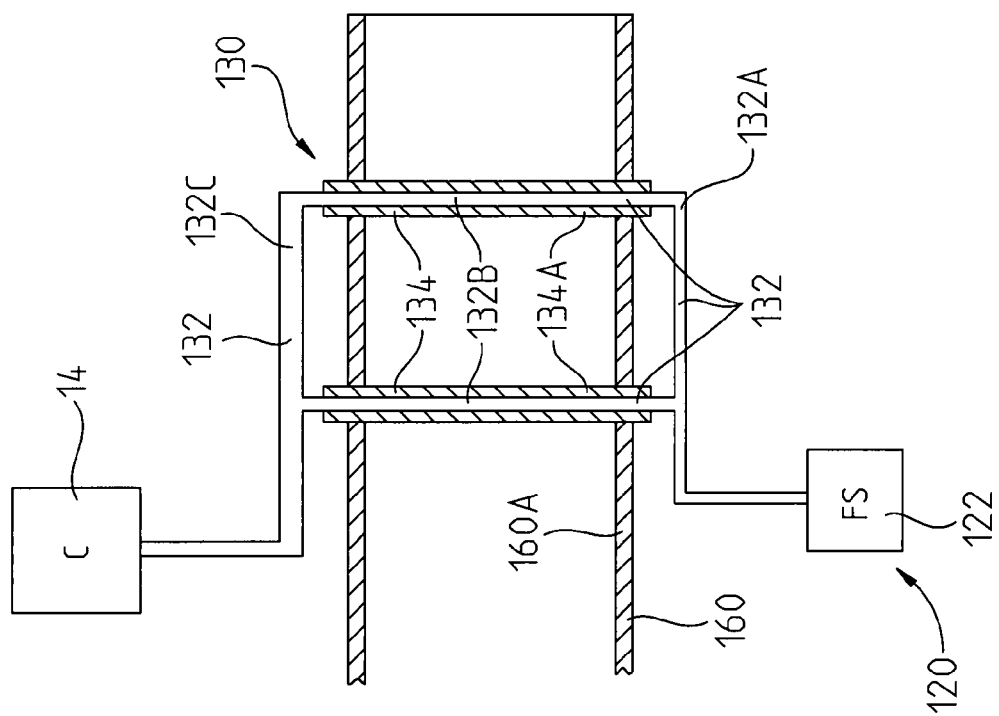
FIG. 5 is a view, partially in cross section, of an end section of a turbine casing and fuel supply apparatus of the gas turbine engine in FIG. 4.

As is apparent from FIGS. 4 and 5, the second pipes 132B extend through the end section 160A of the turbine casing 160. So as to provide thermal protection for the second pipes 132B, and also provide an additional barrier between the fuel passing through the second pipes 132B and the combustion products passing through the end section 160A of the casing 160, the second pipe structure 134 comprises a pair of fourth pipes 134A encasing the second pipes 132B. The first, second, third and fourth pipes 132A-132C and 134A may be formed from a metal, such as stainless steel. Also, the number of first, second, third and fourth pipes 132A-132C and 134A may vary.

Figure 6:
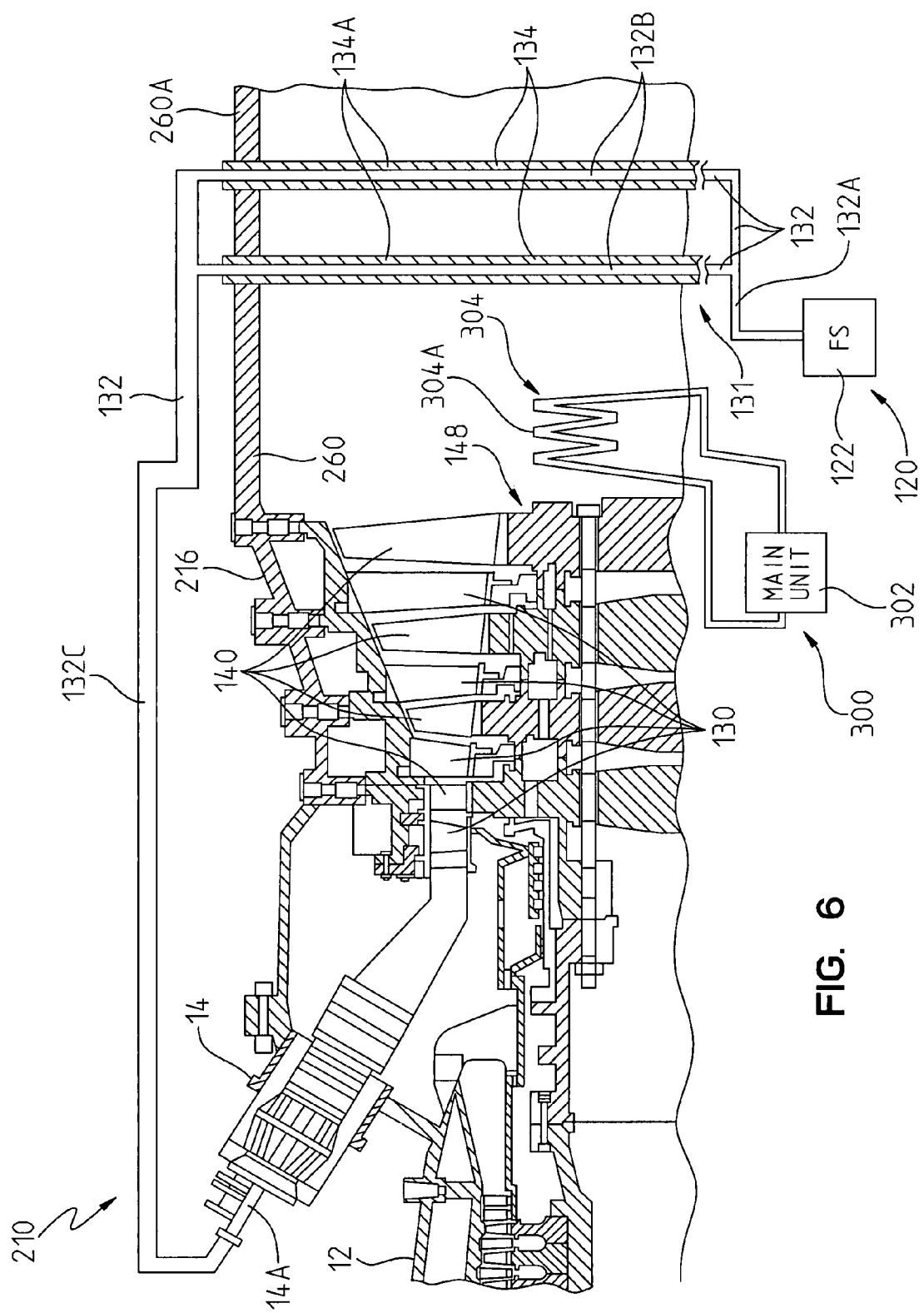
FIG. 6 is a view, partially in cross section, of a gas turbine engine in combination with a heat recovery steam generator constructed in accordance with a third embodiment of the present invention.

A gas turbine engine 210, constructed in accordance with a third embodiment of the present invention, is illustrated in FIG. 6, wherein like reference numerals indicate like elements. The gas turbine engine 210 comprises a compressor 12, a combustor 14, a turbine 216 and a fuel supply apparatus 120. A heat recovery steam generator 300 is used in combination with the gas turbine engine 210, see FIG. 6.

The compressor 12 in the gas turbine engine 210 receives and compresses ambient air. The compressed ambient air is then provided to the combustor 14.

The combustor 14 functions to receive the compressed air from the compressor 12 and fuel from the fuel supply apparatus 120, combine the air and fuel to create an air/fuel mixture and ignite the air/fuel mixture to create combustion products or hot working gases.

The turbine 216 comprises a casing 260 for housing a plurality of stationary vanes 130, a plurality of rotatable blades 140 and a rotatable shaft and disc assembly 148 coupled to the blades 140. The casing 260 receives the combustion products from the combustor 14 such that the combustion products expand within the casing 260 causing the blades 140 and shaft and disc assembly 148 to rotate. The casing 260 comprises an end section 260A through which the expanded combustion products exit the casing 260, see FIGS. 6 and 7.

The fuel supply apparatus 120 comprises a fuel source 122, and pipe supply structure 131 extending from the fuel source 122 through the end section 260A of the turbine casing 260 to the combustor 14. In the illustrated embodiment, the pipe supply structure 131 comprises first pipe structure 132 and second pipe structure 134. The first pipe structure 132 comprises a first pipe 132A extending from the fuel source 122 to a pair of second pipes 132B which, in turn, extend to a third pipe 132C. The first pipe 132A is coupled to the second pipes 132B which, in turn, are coupled to the third pipe 132C. The third pipe 132C is coupled to the combustor 14. It is contemplated that the third pipe 132C may comprise a plurality of third pipes (not shown) coupled to a plurality of nozzles 14A of the combustor 14. A fuel supply pressure source (not shown) causes the fuel to travel from the fuel source 122 through the first, second and third pipes 132A, 132B and 132C to the combustor 14. The fuel passing through the second pipes 132B is preheated by the expanded combustion products passing through the end section 260A of the turbine casing 260. Because the fuel is preheated, the operating efficiency of the gas turbine engine 210 is improved.

Figure 7:
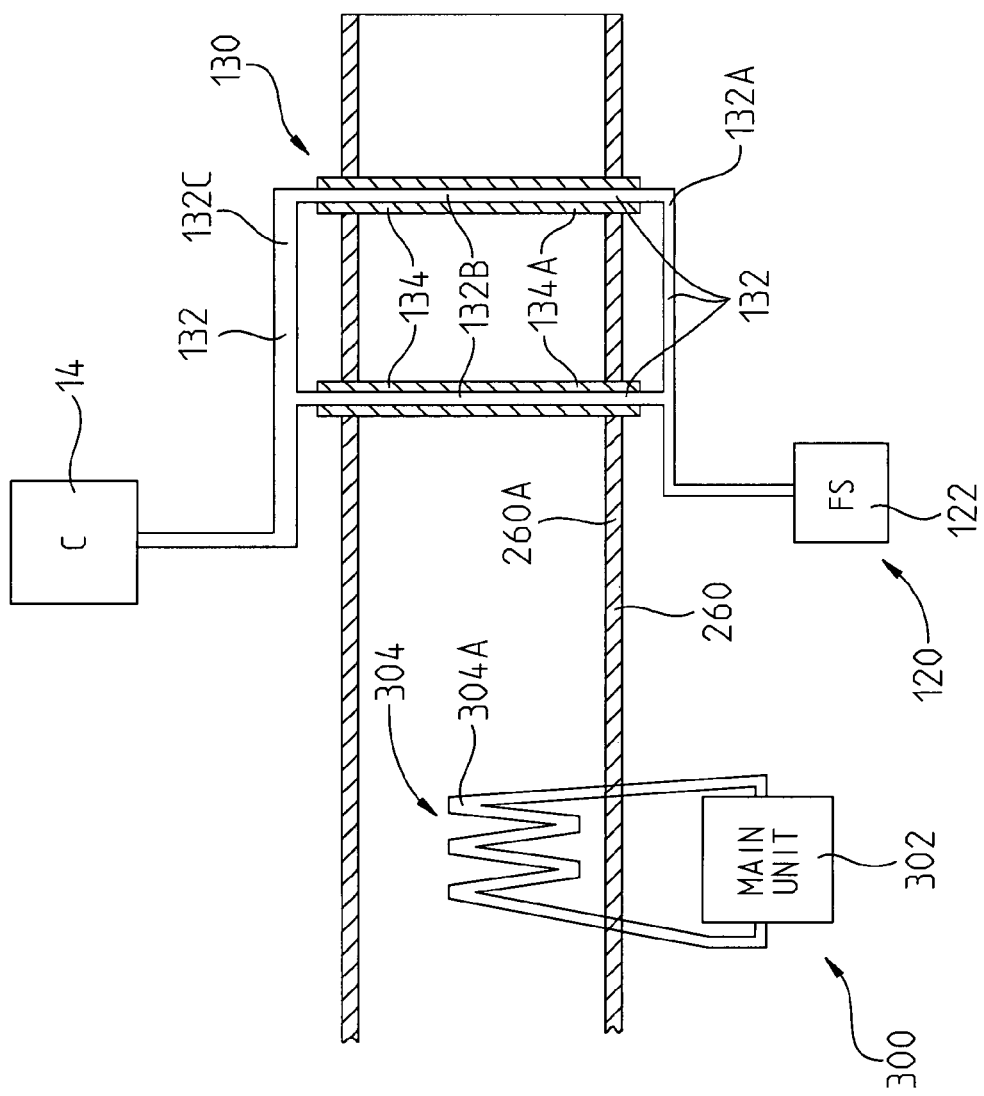
FIG. 7 is a view, partially in cross section, of an end section of a turbine casing and fuel supply apparatus of the gas turbine engine in FIG. 6 in combination with the heat recovery steam generator in FIG. 6.

As is apparent from FIGS. 6 and 7, the second pipes 132B extend through the end section 260A of the turbine casing 260. So as to provide thermal protection for the second pipes 132B, and also provide a further barrier between the fuel passing through the second pipes 132B and the combustion products passing through the end section 260A of the casing 260, the second pipe structure 134 comprises a pair of fourth pipes 134A encasing the second pipes 132B. The first, second, third and fourth pipes 132A-132C and 134A may be formed from a metal, such as stainless steel.

The heat recovery steam generator 300 may comprise a main unit 302 and heat exchange structure 304 located within the turbine casing end section 260A, see FIGS. 6 and 7. In the illustrated embodiment, the heat exchange structure 304 comprises piping 304A. A working fluid, such as water, air or other liquid such as ethylene glycol is supplied to the heat exchange structure 304 by the main unit 302 so as to receive energy in the form of heat from the expanded combustion products passing through the end section 260A of the turbine casing 260. The heated working fluid, such as steam, is then used in the main unit 302 to drive a steam turbine (not shown) forming part of the main unit 302 or to provide steam for other uses.

The pipe supply structure 131 may be located downstream from the heat exchange structure 304 within the end section 260A of the turbine casing 260 so as to allow the heat exchange structure 304 to receive energy in the form of heat from the combustion products prior to the fuel being preheated within the pipe supply structure 131, i.e., the heat exchange structure 304 is exposed to the combustion products when those gases are at a higher temperature than when the gases pass the second pipes 132B. Hence, the pipe supply structure 131 is spaced further away from the vanes 130 and blades 140 than the heat exchange structure 304.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising:
a compressor to compress ambient air;
fuel supply apparatus comprising a fuel source, a cooling apparatus including a heat exchanger and first structure for defining a first path for fuel to travel from said fuel source to said heat exchanger and a second path for fuel to travel away from said heat exchanger;
a combustor to receive the compressed air from said compressor and the fuel from said heat exchanger, combine the air and fuel to create an air/fuel mixture and ignite the air/fuel mixture to create combustion products;
a turbine comprising a plurality of stationary vanes, a plurality of rotatable blades and a rotatable shaft and disc assembly coupled to said blades, said turbine receiving said combustion products from said combustor such that the combustion products expand in said turbine causing said blades and shaft and disc assembly to rotate; and
wherein said cooling apparatus further comprises second structure coupled to and extending between said heat exchanger and at least one of said vanes in said turbine for circulating a coolant fluid through said at least one vane and said heat exchanger, said second structure comprising a pipe structure including a first path extending from said at least one vane to said heat exchanger and including a second path extending from said heat exchanger to said at least one vane, said coolant fluid passing through said second path for cooling said at least one vane as said coolant fluid passes through said at least one vane and said coolant fluid passing through said first path providing an exclusive flow of coolant fluid for transferring energy in the form of heat to said fuel as said coolant fluid passes through said heat exchanger.

2. A gas turbine engine as set out in claim 1, wherein said coolant fluid comprises one of air, steam and ethylene glycol.

3. A gas turbine engine as set out in claim 1, wherein said cooling apparatus second structure is coupled to and extends between said heat exchanger and a plurality of said vanes.

4. A gas turbine engine as set out in claim 1, including a pump located in said second structure for circulating said coolant fluid from said heat exchanger to said at least one vane and from said at least one vane to said heat exchanger.

5. A gas turbine engine as set out in claim 4, wherein said pump is located in said second path between said heat exchanger and said at least one vane.

6. A gas turbine engine as set out in claim 4, wherein said second structure forms a closed loop path extending from said heat exchanger through said second path to said at least one vane and from said at least one vane through said first path to said heat exchanger.

* * * * *